United States Patent [19]

Yokota et al.

[11] Patent Number: 5,598,533
[45] Date of Patent: Jan. 28, 1997

[54] COMPOUND ELECTRONIC APPARATUS HAVING A COMPUTER AND FACSIMILE CONNECTED VIA A COMMON MEMORY FOR COMMUNICATIONS INCLUDING PRINTING COMPUTER DATA WITH THE FACSIMILE

[75] Inventors: Masayuki Yokota; Toshiyuki Nakazawa; Osamu Ogawa, all of Yokohama; Nobuyoshi Tanaka, Tokyo; Hisaya Tabata, Yokohama, all of Japan

[73] Assignee: Canon Kabushiki Kaisha, Tokyo, Japan

[21] Appl. No.: 364,426

[22] Filed: Dec. 27, 1994

Related U.S. Application Data

[63] Continuation of Ser. No. 222,364, Apr. 4, 1994, abandoned, which is a continuation of Ser. No. 607,866, Oct. 30, 1990, abandoned.

[30] Foreign Application Priority Data

Oct. 31, 1989 [JP] Japan ................... 1-281821

[51] Int. Cl.⁶ .................................. G06F 15/167
[52] U.S. Cl. .................... 395/200.08; 395/114
[58] Field of Search ........................ 395/800, 114, 395/115, 116, 200.08

[56] References Cited

U.S. PATENT DOCUMENTS

| 3,558,811 | 1/1971 | Montevecchio | 358/410 |
|---|---|---|---|
| 3,830,962 | 8/1974 | Mailloux | 358/406 |
| 4,652,933 | 3/1987 | Koshiishi | 358/426 |
| 4,849,815 | 7/1989 | Streck | 379/100 |
| 4,910,607 | 3/1990 | Kita et al. | 358/400 |
| 4,947,345 | 8/1990 | Paradise et al. | 358/442 |
| 4,964,154 | 10/1990 | Shimotono | 379/100 |
| 4,991,200 | 2/1991 | Lin | 379/100 |
| 5,115,374 | 5/1992 | Hongoh | 361/393 |

FOREIGN PATENT DOCUMENTS

| 0240667 | 10/1987 | European Pat. Off. . |
|---|---|---|
| 1168161 | 7/1989 | Japan . |
| 2055270 | 2/1981 | United Kingdom . |
| 2189115 | 10/1987 | United Kingdom . |
| 2190267 | 11/1987 | United Kingdom . |
| WO8808564 | 11/1988 | WIPO . |

OTHER PUBLICATIONS

IBM Tech. Discl. Bull. vol. 30, No. 7, Dec. 1987, pp. 307–310 "Use of GIII facsimile as an image scanner and a printer."

*Primary Examiner*—Richard L. Ellis
*Attorney, Agent, or Firm*—Fitzpatrick, Cella, Harper & Scinto

[57] ABSTRACT

An electronic apparatus including a personal computer and a facsimile which are compatible with a general personal computer is provided. The apparatus includes a group of ports and a common memory which are provided between the personal computer and the facsimile and are used to transmit and receive various data. An interruption signal generator generates an interruption signal to the reception side of the apparatus when data is supplied between the personal computer and the facsimile through the ports. An interruption processing program which is started when the interruption signal is received is provided in a main memory of a central processing unit of each of the personal computer and the facsimile. With the present apparatus, various software products for general personal computers can be used without any change, while the facsimile function to transmit and receive image data via a line can be effectively used.

22 Claims, 15 Drawing Sheets

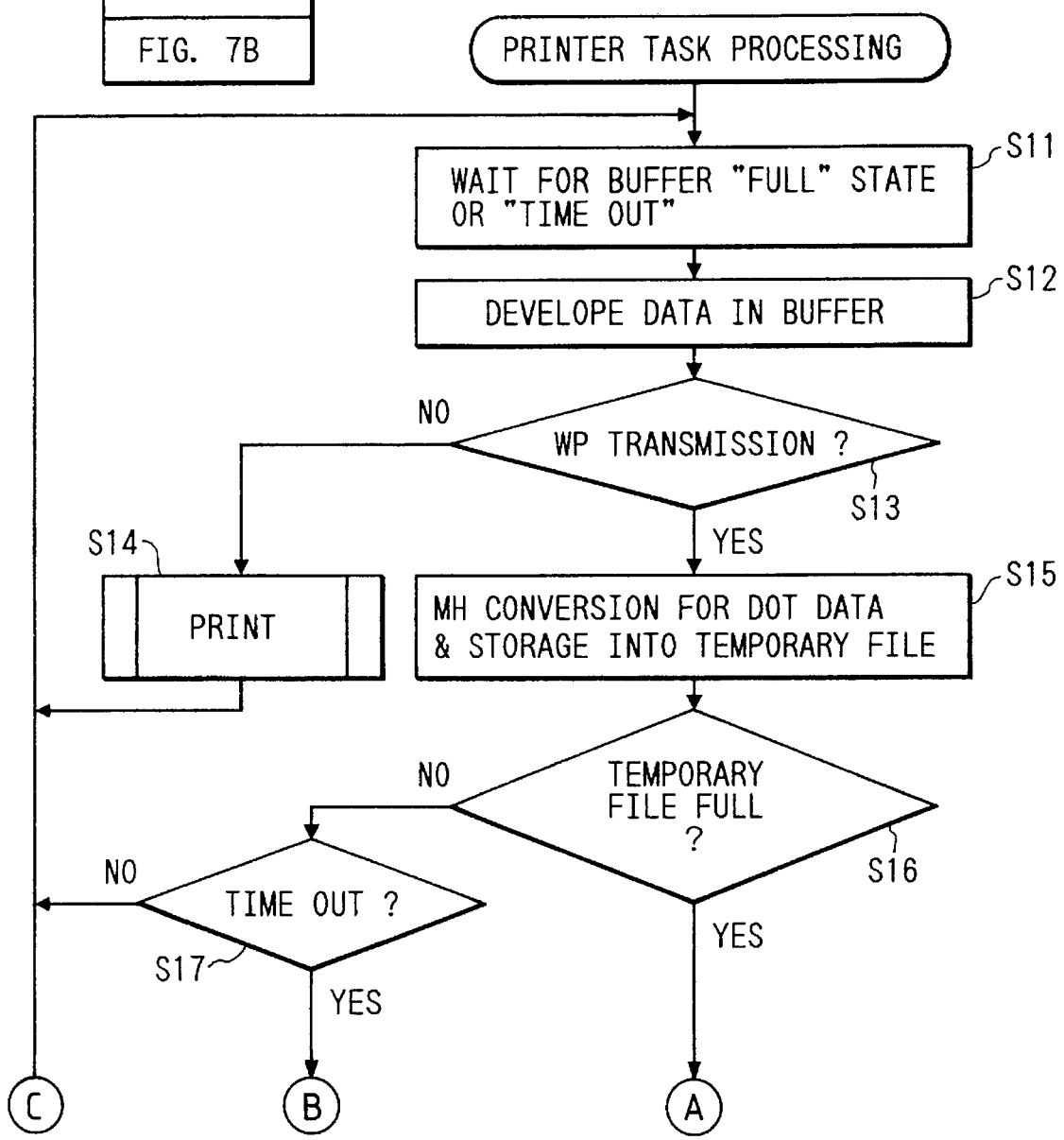

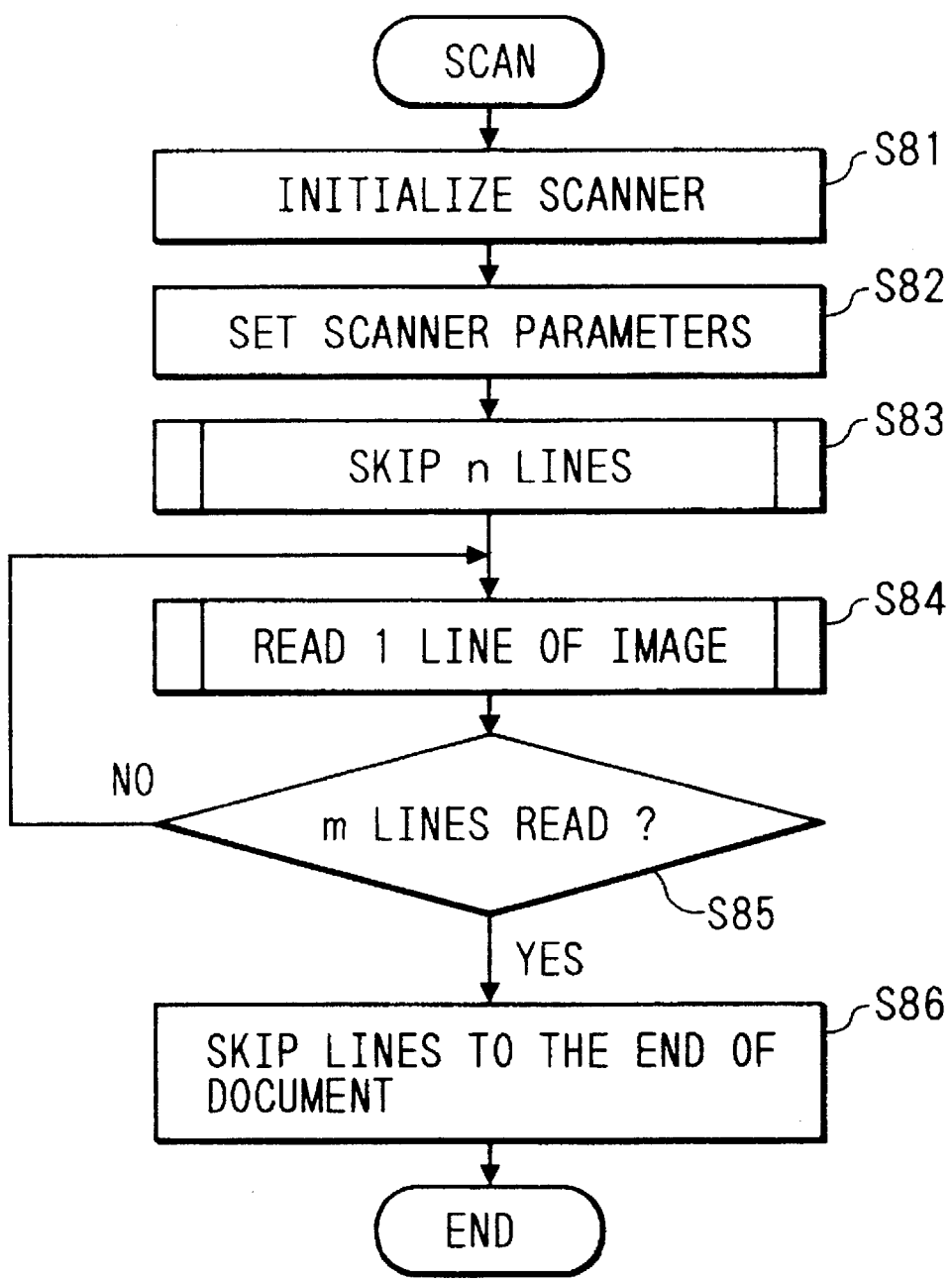

NUMERIC IN THE PARENTHESES INDICATES THE NO. OF BYTES

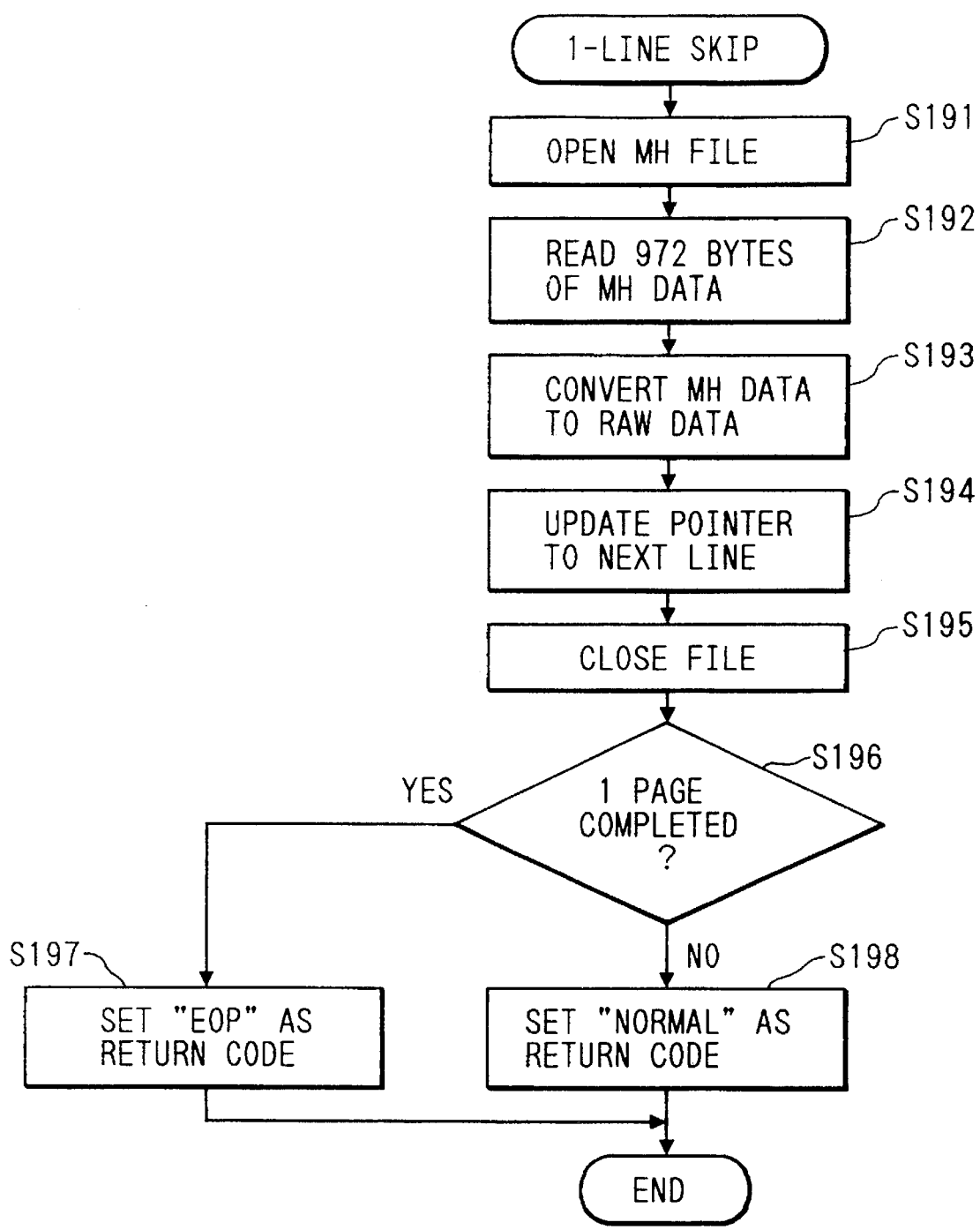

, 533

COMPOUND ELECTRONIC APPARATUS HAVING A COMPUTER AND FACSIMILE CONNECTED VIA A COMMON MEMORY FOR COMMUNICATIONS INCLUDING PRINTING COMPUTER DATA WITH THE FACSIMILE

This application is a continuation of application Ser. No. 08/222,364 filed Apr. 4, 1994, which is a continuation application of application Ser. No. 07/607,866 filed Oct. 30, 1990, now abandoned.

BACKGROUND OF INVENTION

1. Field of the Invention

The present invention relates to a compound electronic apparatus and, more particularly, to a compound electronic apparatus having a general personal computer function and a facsimile function.

2. Related Background Art

In recent years, electronic techniques have developed remarkably. Particularly in the personal computer field, both the hardware and the software which operates the hardware have been improved.

In general, it is well known that a variety of software products which are operated by a personal computer have become widely available. Therefore, when an ordinary person considers purchasing a personal computer, he often will first consider the number of software products which can be operated by the personal computer (or by the operating system thereof).

For the software manufacturer, it is advantageous to manufacture software which can be operated by a personal computer (or by the operating system thereof) that is widely available and that has a large market share.

An apparatus constructed by combining both a personal computer and a facsimile apparatus will now be considered.

An explanation of the personal computer is omitted here. To realize the facsimile function, a novel construction comprising a reading section to read a document, a printing section to print the received image, a line, and a line controller to connect with the line, etc. are necessary.

The operating system, which is operated by the personal computer (electronic apparatus) to which such a facsimile construction to be controlled is newly added, and results in a unique system. Therefore, the software of, for example, a word processor or the like which is operated by the above apparatus must also be independently developed. There is a problem such that a great amount of the software resources widely commercially available cannot be utilized apart from the functions that they already perform.

SUMMARY OF THE INVENTION

The present invention is made in consideration of the above problems. It is an object of the invention to provide a compound electronic apparatus which can utilize commercially available software products for general personal computers without any change, and can effectively use the function of a facsimile which transmits and receives image data through a line.

Another object of the invention is to provide a compound electronic apparatus having both a personal computer and a facsimile which are compatible with a general personal computers having a group of ports and a common memory which are arranged between the personal computer and the facsimile and are used to transmit and receive various data, and a circuit that generates an interrupt signal to the reception side when the data are supplied from one of the personal computer and the facsimile to the other one through the ports. An interruption processing program which is started upon reception of the interruption signal is provided in a main memory of a central processing unit of both the personal computer and the facsimile Still another object of the invention is to provide a compound electronic apparatus, wherein a group of ports and a common memory are arranged between a personal computer and a facsimile and when data are supplied from one of them to the other one, a processing corresponding to the received data is executed by interrupting the processing which has been executed so far so as to output the interruption signal to the reception side.

BRIEF DESCRIPTION OF THE DRAWINGS

FIGS. 7, 7A and 7B are flowcharts showing a processing procedure for a printer task in the facsimile in the embodiment;

FIG. 8 is a diagram showing a general reading processing procedure by the image scanner;

FIG. 17 is a flowchart showing the content of a skipping process of one line in the case where the FAX received data is used as an object to be read.

DETAILED DESCRIPTION OF THE PREFERRED EMBODIMENTS

An embodiment according to the invention will now be described in detail with reference to the drawings.

DESCRIPTION OF THE OUTLINE OF CONSTRUCTION

A compound electronic apparatus of the embodiment is constructed with a personal computer and a facsimile (which can be also used as a telephone by using a handset). The personal computer can be an XT personal computer (hereinafter, simply referred to as PC-XT) made by IBM Corporation of the U.S.A., or the liked and can directly use the commercially available software for the PC-XT. Although the personal computer and the facsimile operate independently, they can also operate interlockingly by a construction which will be explained below. A standard "MS-DOS" (registered trade name of Microsoft Corporation of U.S.A.) for the PC-XT is used as an operating system (OS).

Figure 1:
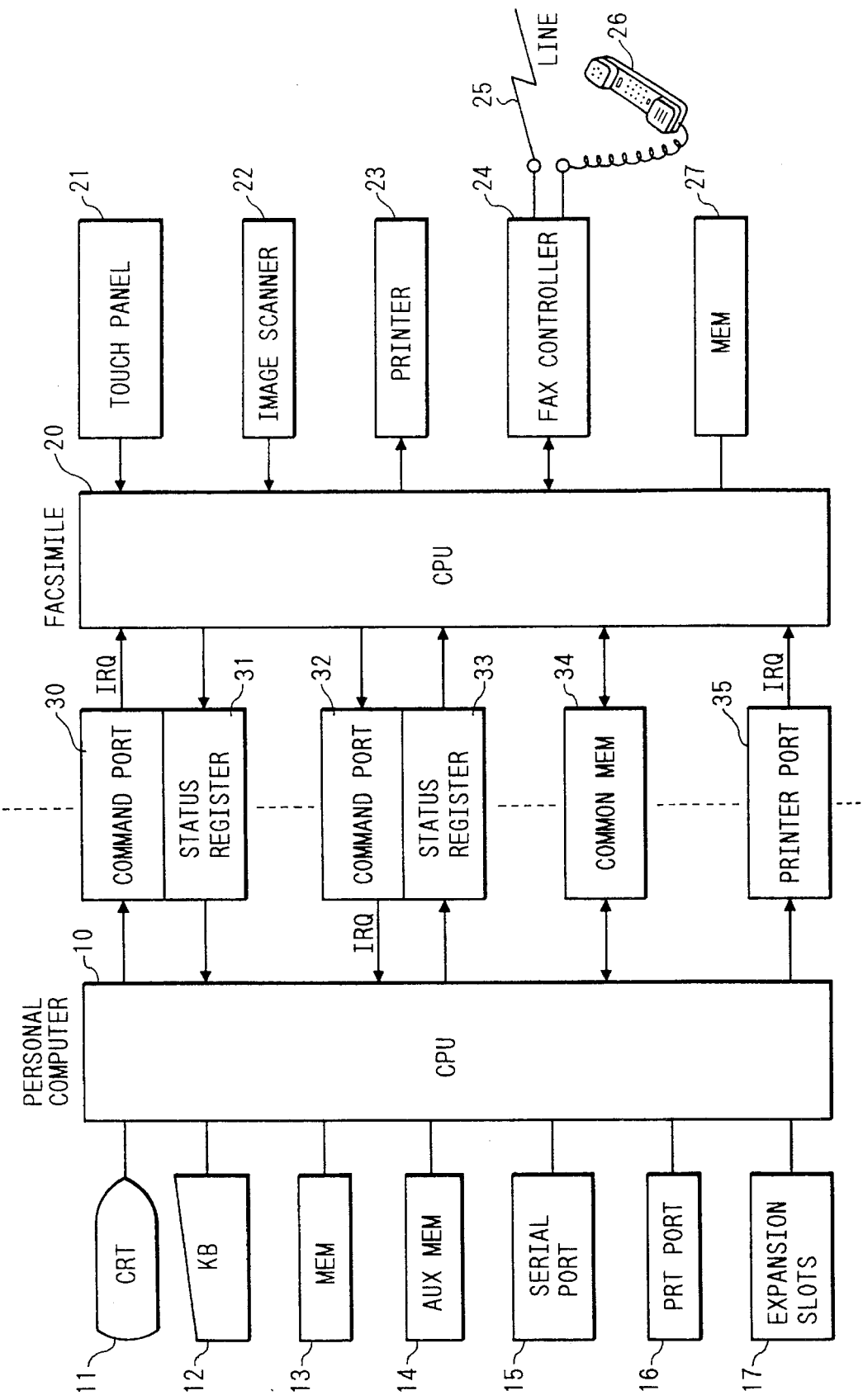
FIG. 1 is a block arrangement diagram of a compound electronic apparatus in an embodiment of the present invention.
Figure 2A:
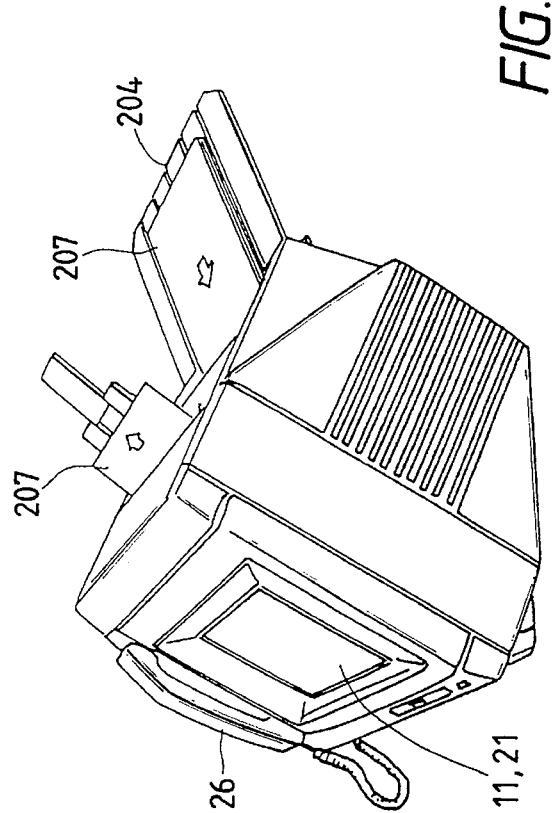
FIGS. 2A, 2B and 2C are external views of the compound electronic apparatus.
Figure 2B:
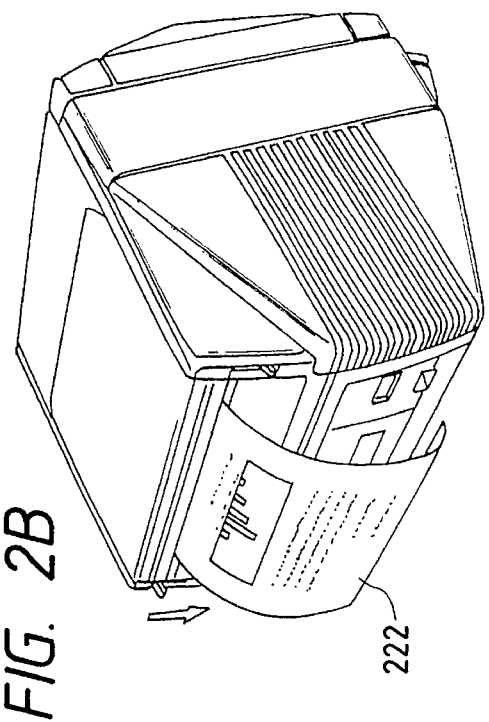
Figure 2C:
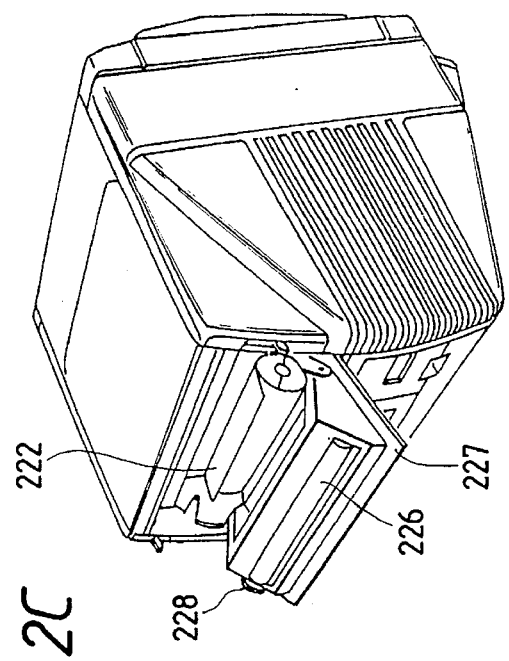

FIG. 1 shows a block diagram arrangement of the compound electronic apparatus of this embodiment. FIGS. 2A to 2C show external views (a keyboard is not shown) of the compound electronic apparatus.

Reference numeral 10 denotes the central processing unit (CPU) of the personal computer, which is a 16-bit "8086" CPU made by Intel Corporation of the U.S.A. and which is used in the PC-XT. A CRT 11, a keyboard 12, a memory 13, an auxiliary memory device (floppy disk device) 14, a serial port 15, a printer port (based on the standard of Centronics Corporation) 16, expansion slots 17, and the like are provided to construct the personal computer which is compatible with the PC-XT. Since those components are general components provided for ordinary personal computers, their detailed descriptions are omitted here.

The "V50" CPU, made by NEC Corporation, is used as CPU to control the whole facsimile. A transparent touch panel 21 arranged in front of the CRT 11, an image scanner 22 to read a documents a printer (line printer) 23 for visualizing a received image and outputting, a FAX controller 24 for controlling the transmission and reception of the facsimile, and a memory 27 which is used during the operation of the CPU 20 are all connected to the CPU 20.

FIG. 2A shows a state in which a document 207 is being read, while FIG. 2B shows a state in which the received FAX image is being printed onto thermal recording paper. A thermal recording paper 222 has a roll-shape and is held in the rear portion of the main body. FIG. 2C shows a state in which a lid 227 of the rear portion of the main body is open, showing that the roll-shaped recording paper 222 is enclosed in the rear portion. Reference numeral 204 in the diagram denotes a stacker to set documents to be read. Reference numeral 226 denotes a feed roller of the recording paper 222. When the lid 227 is closed, a gear 228 attached to a shaft of the roller 226 is engaged with a gear (not shown) of the main body, thereby allowing the rotation of a paper feed motor to be transferred.

Figure 4:
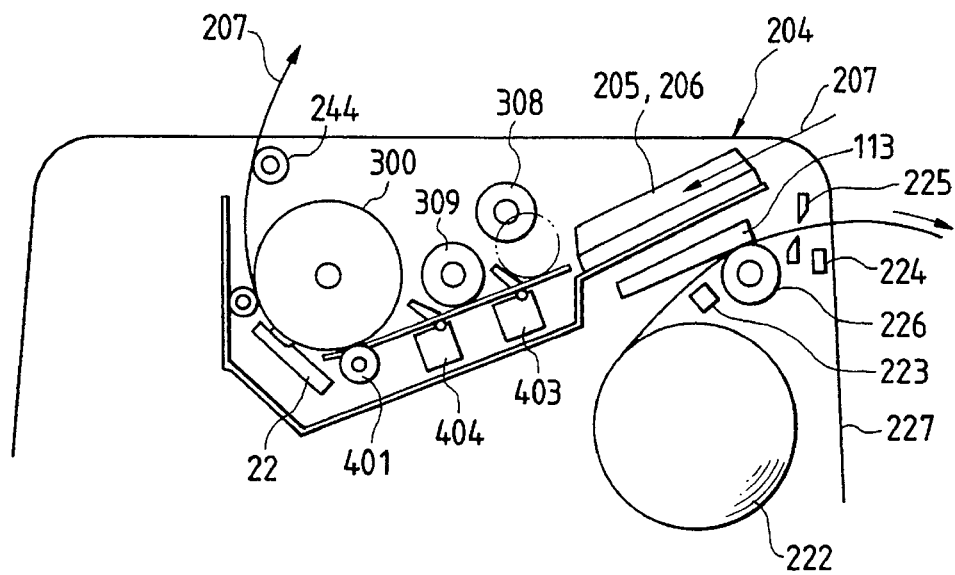
FIG. 4 is a cross sectional view of an image scanner and a printer and its peripheral devices in the facsimile in the embodiment.

FIG. 4 shows a cross sectional view of a document reading mechanism, a mechanism for recording the image onto the thermal recording paper 222, and its peripheral components.

In this diagram, reference numerals 205 and 206 denote document guides which are set by an operator to correspond to the width of the documents (the document surface is set to the lower side) stacked on the stacker 204. When pickup roller 308 is located at the position shown by the broken line in FIG. 4, the documents 207 on the stacker 204 are pulled out onto a conveying path by the pickup roller 308 and are separated one by one by a separating roller 309. Each paper is conveyed on the conveying path toward the side of a platen 300. When the document 207 is conveyed to the position where it is sandwiched by the platen 300 and a pinch roller 401, the pickup roller 308 is moved up to a position shown by the solid line in the diagram and the conveyance of the next document is inhibited. Reference numeral 403 denotes a sensor which is arranged on the conveying path on the downstream side of the pickup roller 308 and which detects the presence or absence of the sheets on the stacker 204. Reference numeral 404 indicates a document sensor which is arranged on the conveying path on the downstream side of the separating roller 309 and which detects the conveyance of the sheet by the separating roller 309. The document 207 sandwiched between the platen 300 and the pinch roller 401 is guided to the image scanner (which is in contact with the platen with a predetermined pressure) 22 and stopped. After that, the document 207 is sandwiched by the platen 300 and the pinch roller 401 and is read line by line by the rotations thereof, while the document is discharged to the outside by a discharge roller 244. The above description relates to the outline of the operation of the image scanner 22 in the embodiment.

The operation by which printer 23 prints onto a thermal recording paper will now be described with reference to FIG. 4.

The thermal recording paper 222 which is wound in a roll is rotatably enclosed in the main body of the apparatus. One end of the paper is sandwiched between the roller 226 and a thermal line head 113. The paper 222 which was recorded by the head 113 is discharged to the outside by the rotation of the roller 226. As is readily apparent, the thermal line head 113 has almost the same width as that of the thermal recording paper 222 and is arranged almost perpendicularly to the conveying direction of the paper 222, thereby recording line by line. Reference numeral 223 denotes a sensor which is arranged on the upstream side of the roller 226 and which detects the presence or absence of the thermal recording paper. Reference numeral 224 indicates a sensor which detects that the lid 227 in the rear portion of the main body was opened upon exchange of the paper 222, and reference numeral 225 represents a cutter which cuts the paper 222 after data of one page was recorded onto the paper 222.

Returning to FIG. 1, the personal computer and the facsimile are connected through various ports and registers, and through a common memory used by the CPUs 10 and 20. That is, in the diagram, command ports 30 and 32, status registers 31 and 33, common memory 34, and printer port (based on the standard of Centronics Corporation) 35 are used to connect the personal computer and the facsimile. Except for the common memory 34, the above ports, registers, and the like are constructed on one gate array.

When inputting a certain instruction from the personal computer side to the facsimile, it is sufficient to output the command data representing the instruction to the facsimile through the command port 30. A strobe signal is output after the command data was output to the command port. When the command data was sent to the command port 30, a BUSY terminal of the status register 31 is turned on by the hardware. The status of the BUSY terminal is turned off (ready state) when the facsimile side can accept the next command. The CPU 20 sets a signal indicative of such a command acceptable state to the status register, thereby turning off the BUSY terminal.

If parameters or the like which are transmitted to the facsimile exist upon generation of a command, it is sufficient to generate the command data after the parameters or the like were written into the common memory 34. Since the received command data is analyzed on the facsimile side, the presence or absence of the parameter data can be discriminated.

By a similar principle, when the CPU 20 of the facsimile outputs the command data to the personal computer, the command port 32, the status register 33 and, if necessary, the common memory 34 are used. Since the operation in this case is substantially the same as that in the case of transmitting the data from the CPU 10 to the CPU 20, its detailed description is omitted.

In the case where the personal computer side generates an interruption signal to the CPU 20 of the facsimile, printer port 35 is used. The printer port 35 is similar to the printer port 16 provided for the personal computer which has already been shown. When data of an object to be printed is output to the facsimile side through the printer port 35, an interruption occurs in the CPU 20. Ordinarily, the print-out data of the personal computer is output via the printer port 35. Although details will be explained below, the printer port 16 provided for the personal computer is used to connect the "second printer."

Figure 3:
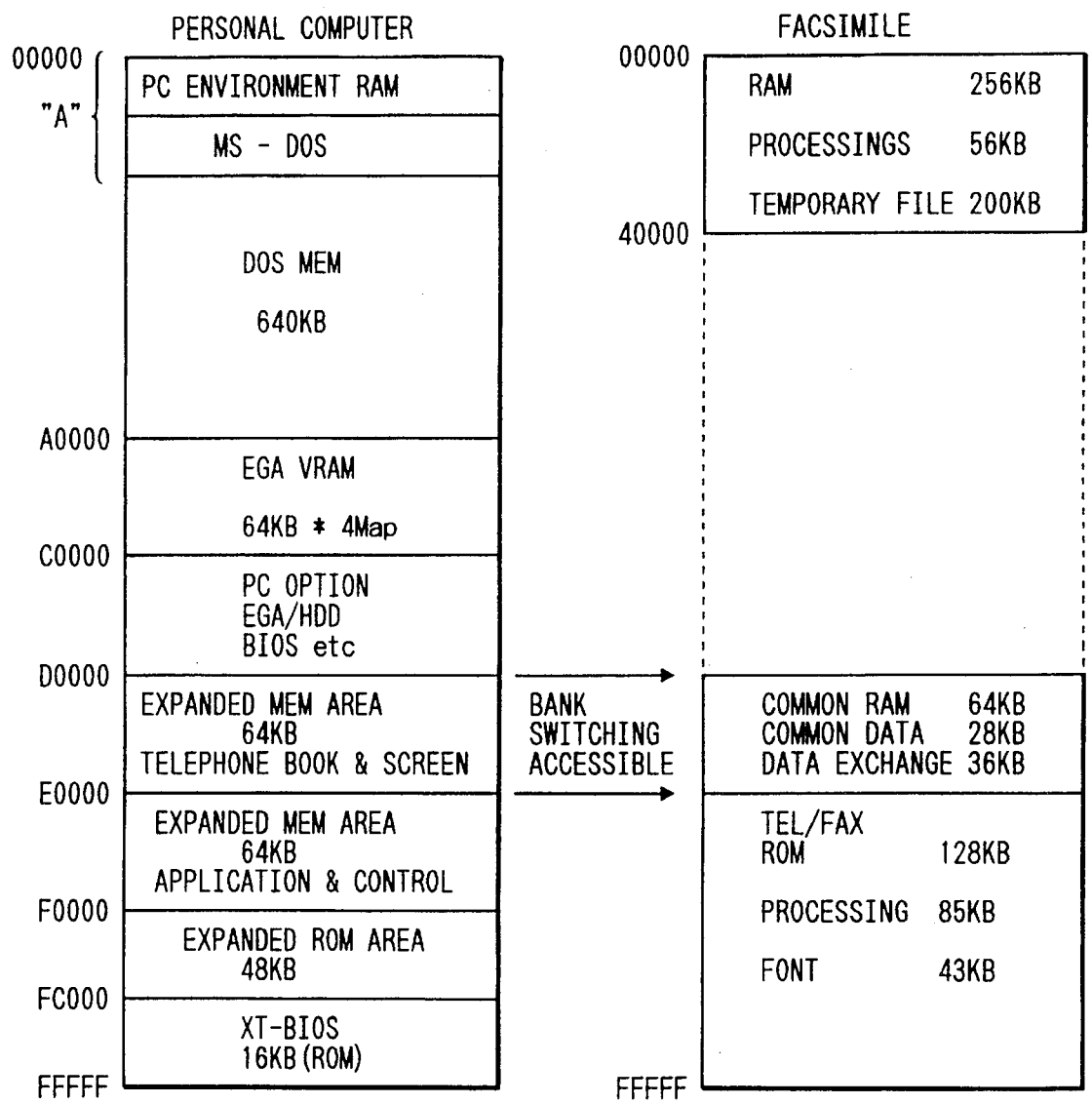
FIGS. 3 is a diagram showing the relation between the memory maps of CPUs in a personal computer and a facsimile in the embodiment.

FIG. 3 shows memory maps of the CPUs 10 and 20 in the personal computer and the facsimile in this embodiment. On the personal computer side, the MS-DOS operating system uses area "A", addresses "A0000$_H$" to "CFFFF$_H$" (H indicates a hexadecimal number), and addresses "FC000$_H$" to "FFFFF$_H$". The user (or application program) can use only about 640 kbytes, from address "00000$_H$" to "A0000$_H$" excluding area "A". In this embodiment, a driver program needed to couple with the facsimile is always provided in addresses "D0000$_H$" to "FBFFF$_H$" as a free storage area of the MS-DOS. In this free storage area, the space of 64 kbytes in addresses "D0000$_H$" to "DFFFF$_H$" is constructed by the common memory 34. The common memory is a RAM having a capacity of 128 kbytes, and executes a bank switching on a 64-kbyte unit basis.

The memory 27 on the facsimile side is accessed by the CPU 20 and cannot be directly accessed by the CPU 10. Therefore, the memory space of the CPU 20 doesn't need to be controlled by the general operating system as in the personal computer as shown in the diagram. However, in addition to an interrupt processing, which will be explained below, processing relating to the transmission and reception of data of the facsimile, character font patterns and the like, and a program to emulate a printer that is connected to the PC-XT, are stored in a ROM area of addresses "E0000$_H$" to "FFFF$_H$." The data received through the printer port 35 is printed by the printer 23.

The outline of the construction of the electronic apparatus in the embodiment has been described above.

DESCRIPTION OF DATA TRANSMISSION AND RECEPTION

The outline of the processings relating to the data transmission and reception between the personal computer and the facsimile will now be described.

The CPU 10 of the personal computer executes various application programs under the management of the operating system "MS-DOS" in the manner described above. Because the application program is software for the PC-XT, the user may think that, to access to the command ports 30 and 32, status registers 31 and 33, common memory 34, and the like (excluding the printer port 35), the application software must have been programmed so that these may be accessed. However, it is not always necessary to program the application software in this way. In the embodiment, the program of the device driver or the like using the command port and the like is always provided in the space area of the "MS-DOS" as already described with reference to FIG. 3. The program begins with the interrupt signal generated when the CPU 20 of the facsimile sets the command data to the command port 32. When the CPU 10 of the personal computer receives the interrupt signal, the application or the like which has been executing is interrupted, and the program which is always provided in the space area is executed. In the beginning of the program, a processing to analyze the command data which was set in the command port 32 is first executed and a subroutine corresponding to the result of the analysis is called. Various command data are output to the facsimile side through the command port 30 as necessary by each of the subroutines. Since communication between the personal computer and the facsimile is initiated by the execution of the above procedure, the subsequent communication is performed by the program to transmit and receive each command data. Such processing procedure is clearly shown in FIG. 6.

The CPU 20 on the transmission side of the command data waits until the CPU 10 on the reception side of the command data is set to a receivable state. After that, if parameters or the like associated with the command data exist, they are set into the common memory 34 and the command data is set to the command port 32.

On the other hand, the CPU 10 on the reception side first analyzes the received command data by the interrupt processing. If the parameters associated with the command data exist, the CPU 10 also reads the parameter data from the common memory 34. The processing corresponding to the received command is initiated and a signal to turn off the BUSY terminal is output to the status register 33 when the time at which the reception of the next command data is permitted has come.

Figure 6:
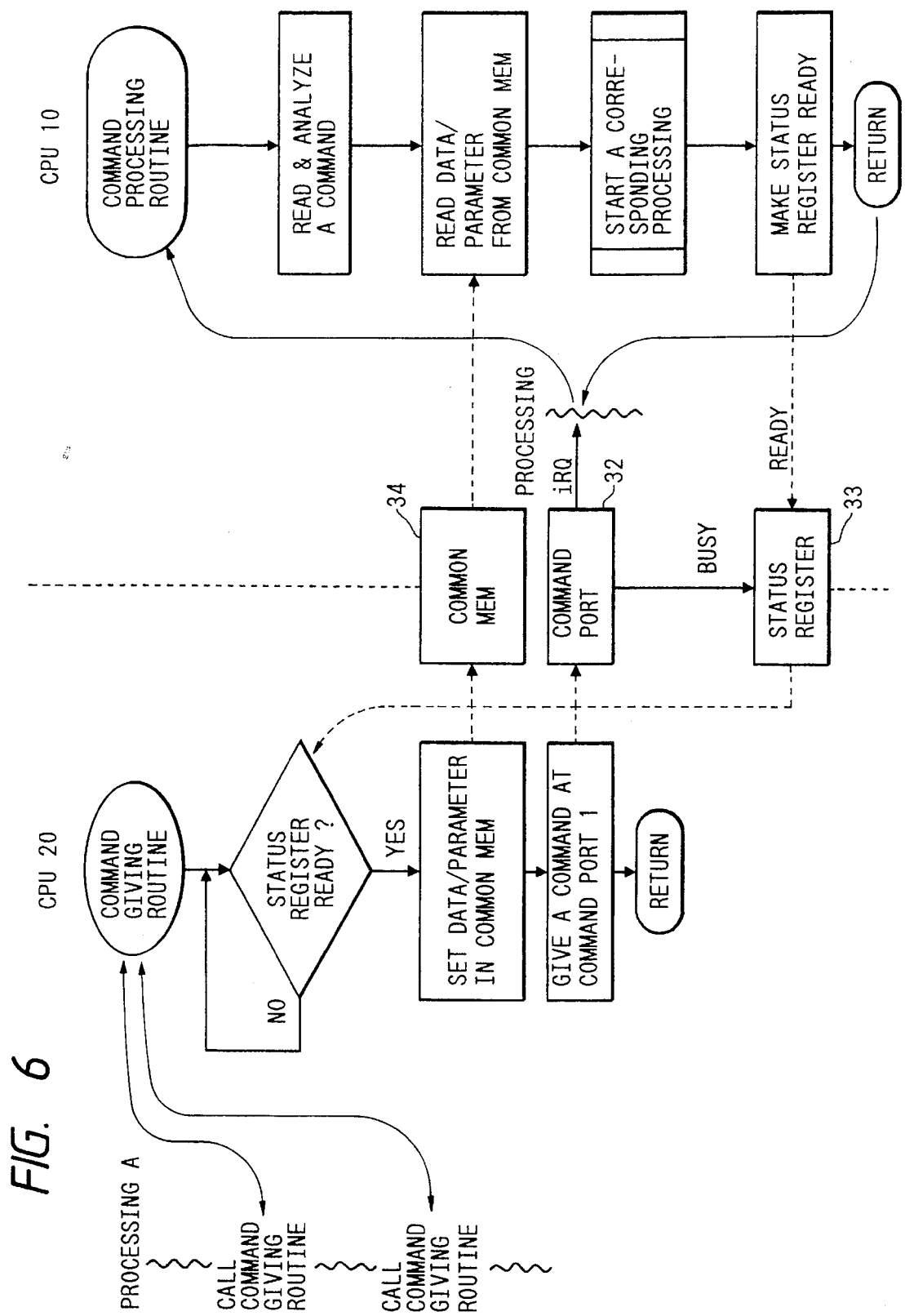
FIG. 6 is a diagram for explaining the communication principle in the personal computer and the facsimile in the embodiment.

Although FIG. 6 shows the case where the CPU 20 generates command data to the CPU 10, substantially the same processing is executed when CPU 10 generates command data to CPU 20. The above data transmission and reception are also executed during the processing corresponding to each command data.

It is possible to consider that the facsimile outputs command data to the personal computer when it is determined that, fundamentally, the facsimile side receives some information that it must send to the personal computer. For instance, there is considered a case where the CPU 20 detects that the touching operation has been executed to the touch panel 21, or the like.

Figure 5:
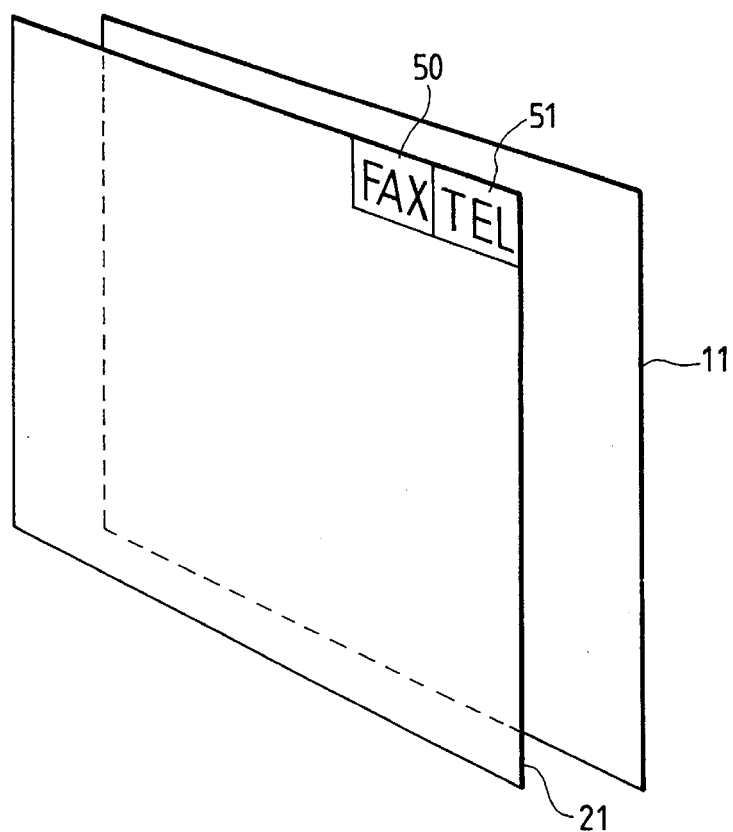
FIG. 5 is a diagram showing the positional relation between a touch panel and a display screen in the embodiment.

Although the positional relation between the touch panel 21 and the CRT 11 has already been described, a practical example is shown in FIG. 5. Marks 50 and 51 such as "FAX", "TEL", or the like are printed at a right upper position of the touch panel 21 small enough so that they will not obstruct the display content on the display screen of the CRT 11. When the mark 50 is touched (that is, when a command to execute the facsimile transmission is given), the CPU 20 of the facsimile generates command data indicating that the touch panel 21 was touched, data indicative of the touched position, and the like via the command port 32 and common memory 34. Due to this, the CPU 10 of the personal computer receives the interrupt signal and temporarily interrupts the processing of the application program (or the command input waiting state of the OS) which has been executing, and executes a display processing of a menu or the like regarding the facsimile transmission (the content displayed until that point is saved into the space area). Then, by selecting one of the menus, the document image is set onto the stack 204 according to circumstances and, then, dial numbers displayed on the CRT 11 are touched or the like, thereby outputting data such as a partner's telephone number or the like which is necessary for transmission to the facsimile side. At this time, it is also possible to display a telephone directory or the like on the display screen and to select either one of them by the operator. In any of the above cases, the CPU 20 of the facsimile knows that the parameter such as a partner's telephone number or the like exists in the common memory 34 by receiving and analyzing the received data. After that, the CPU 20 executes a well-known procedure such that the document image which was read by the image scanner 22 is facsimile transmitted. In the case of calling, the operator picks up a handset 26 or touches the mark 51 so that he can call. The case of first generating command data from the facsimile to the personal computer is not limited to only the above example. For instance, command data are also generated in the case where if an originating call was input from the outside, a message indicative of the presence of the originating call is displayed on the CRT 11 or in a case where a message indicative of the absence of the thermal recording paper 222 is displayed, or the like.

DOCUMENT PRINTING

As also already described above, the personal computer side outputs the printing data (one-byte unit) through the printer port 35. The CPU 20 on the facsimile side fetches the printing data from the printer port 35 and stores it into a reception buffer or the like by an interrupt routine which is received at this time. Further, the program to emulate the printer which is connected as a standard printer to the PC-XT is started and the printing data is printed by the printer 23.

Due to this, by executing the printing by the application program which can be operated by the personal computer side, a visual image can be output by the printer 23 provided for the facsimile. The data which is printed at this time is not limited to only "sentences" in this meaning. This is because application software such as CAD, spread sheets, and the like which can be operated by the PC-XT can be printed by at least a printer which can be connected to the PC-XT without limiting to only the word processor software. This is because the printer is obviously emulated in the embodiment.

In this case, thermal recording paper is used. Printing can also be accomplished by using another printer (such as a wire-dot printer or the like) by connecting that printer to printer port 16 provided for the personal computer side. It is sufficient to merely install a device driver program to switch an output object port from the printer port 35 to the printer port 16.

WORD PROCESSOR TRANSMISSION

Generally, when executing the facsimile transmission, the document image read by the image scanner 22 is transmitted by the FAX controller 24. In the embodiment, in addition to the facsimile transmission for the application program (for instance, English word processor, spread sheet type, or software such as CAD or the like) which can be operated by the personal computer, a print image (document, figure, or the like) can be directly facsimile transmitted by merely selecting the print command menu which is provided by the program without changing the application program at all.

An example of FAX transmitting a document formed by the English word processor software which is operated by the PC-XT will now be explained.

Fundamentally, it is sufficient that command data indicating the data that will be output via the printer port 35 is used not for printing but for facsimile transmission, and is output to the facsimile side during the activation of the English word processor software (it is also possible to output such command data before the English word processor software is started). That is, by touching the mark 50 or "FAX" on the touch panel 21, a message indicative of the execution of the FAX transmission is sent to the CPU 10. Although the CPU 10 displays the menu picture frame by the interrupt routine at this time, an item indicative of the execution of word processor transmission is provided on the menu. The operator sees and touches this item. The facsimile side transmits data indicative of the touched position or the like to the personal computer side, so that the CPU 10 can know that the word processor transmitting mode was selected. After that, buttons to input a telephone number are displayed on the display screen and the proper buttons corresponding to the telephone number on the partner side to be transmitted are sequentially touched, thereby inputting the telephone number of the destination of transmission. After completion of the data setting regarding the facsimile transmission, command data indicative of the word processor transmitting mode and the parameters such as destination telephone number and the like are sent to the facsimile and the inherent word processor software is restarted. By instructing the printing operation during the operation of the word processor software, document data are output to the facsimile through the printer port 35.

Since the facsimile has already received the command indicative of the word processor transmission and the parameter (telephone number of the destination of the transmission), the facsimile knows that the "printing data" from the personal computer is used not for printing but for facsimile transmission. Thus, the facsimile is in the standby mode for the word processor transmitting processing at this point in time. In this task, to print the received data using an emulating function, the dot image data is stored in a space area in the memory 27 (the processings until now are the same as those in the ordinary printing of sentences or the like). After that, it is sufficient to execute substantially the same processing as in the case of transmitting the document image which was read by the image scanner 22. Briefly explaining, the image stored in the memory is compressed and encoded, and is transmitted to a facsimile apparatus on the partner side connected to the line in accordance with a predetermined protocol.

The above word processor transmitting processings will now be summarized. The following characteristic advantages can be obtained.

First of all, in the case of the application software which is operated by the PC-XT as well as the word processor software, the data or the like which was formed (generated) by the software can be FAX transmitted by substantially the same operation as the ordinary printing operation. Second, a program such that the file stored in the conventional disk is converted into the file for transmission in a software manner is only effective with the specific application software and is not effective with general software. However, the embodiment can cope with every application software. Therefore, although the embodiment has been described with respect to the case of word processor transmission, it will readily appreciated that such an explanation has been made for convenience of description.

On the other hand, there is also an advantage such that the personal computer is rapidly released from the printing operation in dependence on the capacity of the reception buffer in the facsimile as a reception side of print data.

DESCRIPTION OF PRINTER TASK PROCESSING

Substantially the same processings are executed for the above-described document printing and word processor transmission when they are seen by the application software which is operated by the personal computer. In brief, there is a difference between the two with respect to whether or not a command for the word processor transmission has been given to the facsimile by touching the mark 50 or the like on the touch panel 21 during the operation of the application software before the "print" command, as one of the functions of the software products, is instructed. In other words, the print data is printed or FAX transmitted by the processing on the facsimile side as a reception side of the print data.

Figure 7B:
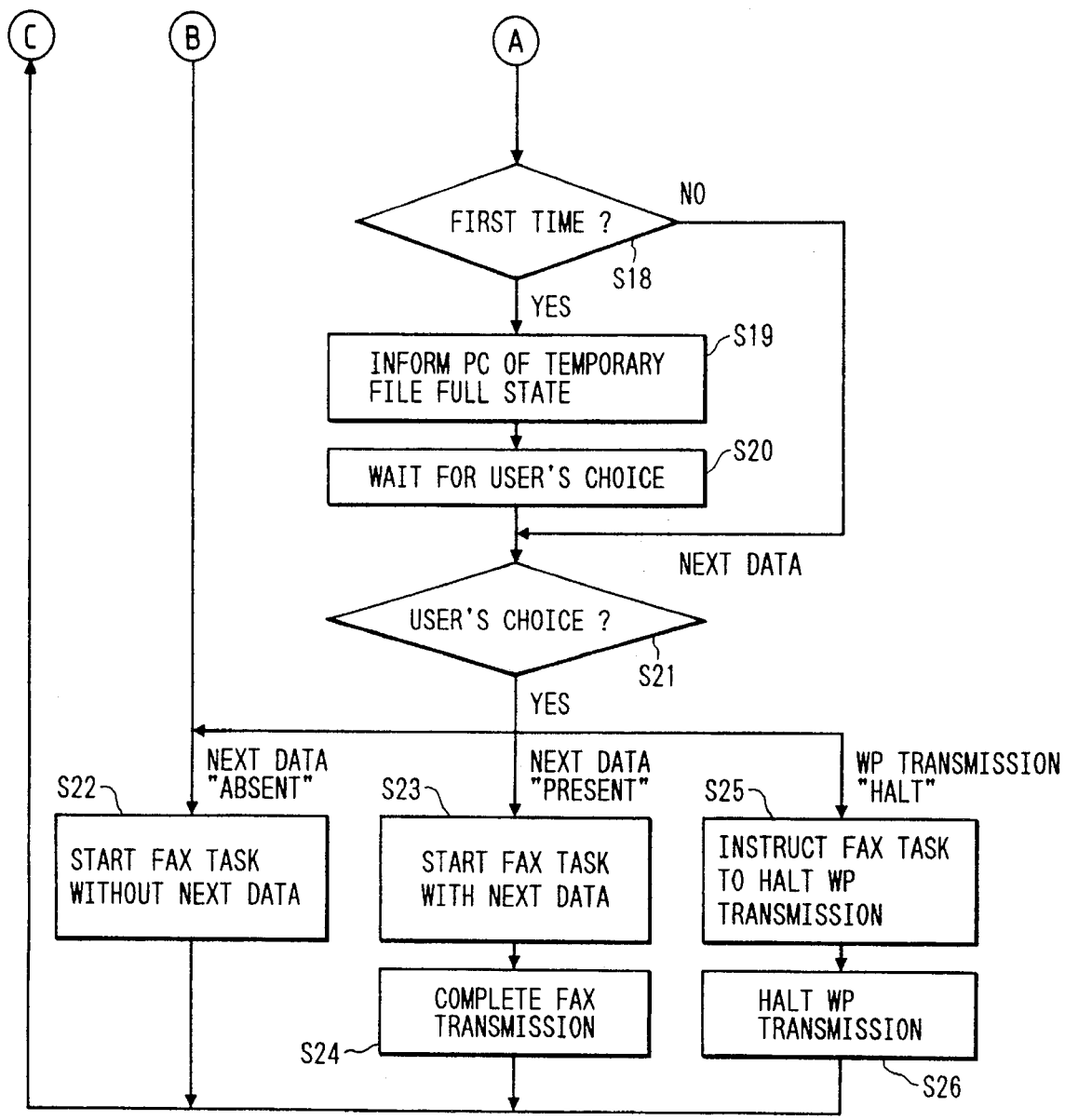

The content of the operation processings of the CPU 20 on the facsimile side will now be described with reference to the flowchart of FIG. 7. In addition to the flowchart shown in the diagram, a processing to receive the print data exists as an interrupting processing. The interrupt processing is started when the personal computer outputs the print data to the printer port 35. The data latched in the printer port 35 is fetched and stored into the reception buffer provided in the memory 27.

In step S11, the apparatus waits until the reception buffer is filled with data from the interrupt processing, or until the timer has timed out. "Time out" denotes the case where the next data is not input from the personal computer side even after the elapse of a predetermined time and copes with the word processor transmission (the details will be explained below). If the reception buffer is in the "full" state, or if "time out" has occurred, step S12 follows and the print image corresponding to the received print data is stored into the printing buffer. After that, a check is made to see if a command for the word processor transmission has already been received from the personal computer. If the print data was received without receiving any command, this means that the stored image data is the data to be printed by the printer 23. Therefore, the processing routine advances to step S14 and the emulation as an ordinary printer which is connected to the PC-XT is executed, thereby printing with the printer 23. The printer 23 is a line printer and is inherently used for a facsimile, so that the resolution differs from that of the printer to be emulated. Therefore, an interpolating (or thinning-out) processing or the like is executed on the stored image data, and the image data is printed at the same character size as that in the case where it was printed by the emulated printer. Since a well-known processing is used as an interpolating or thinning-out processing, its detailed description is omitted here.

If command data (including parameter data or the like) indicative of the word processor transmission was received from the personal computer before the print data is received, the processing routine advances to step S15.

It is known that the FAX transmission is executed on a page unit basis and, upon FAX transmission, data indicating whether the target page is the last data (the data which is subsequently transmitted exists) or not is also transmitted to the facsimile apparatus on the partner side. However, since the data which is sent from the personal computer is fundamentally print data, if the received data is simply sequentially stored as image data and converted into the MH-encoded data or the like, the transmission side cannot discriminate which data is the last transmission data. Therefore, in the embodiment, if the next data is not input even after the elapse of a predetermined time after the latest print data has been received, that is, when the foregoing "time out" has come, it is determined that the data which was received so far is the data to be transmitted.

In step S15, the stored image data is encoded into the MH data and stored into a temporary file (200 kbytes are provided as shown in FIG. 3). Then, if it is decided that the temporary file is not filled with the image data, the processing routine advances from step S16 to step S17 and a check is made to see if "time out" has occurred or not. If a "time out" has not occurred, the processing routine returns to step S11 for preparation of the reception of the next data.

If it is determined that the temporary file is full, step S18 follows and a check is made to see if the temporary file which was full at this time point is the first time file. If it is, step S19 follows and command data indicative of the "full state" of the temporary file is sent to the personal computer via the command port 32. In response to this command data, the personal computer starts the interrupt processing and displays selection menus indicating "only the present page is transmitted," "all of the pages are transmitted," "the transmission is halted," or the like on the CRT 11o The user looks at the display and selects the proper menu by touching panel 21.

The data transmission and reception between the personal computer and the facsimile after the menus were displayed are executed as follows.

If the facsimile detects that the touch panel 21 was touched after the display of the menus, a command indicating that the touch panel was touched, the coordinates of the position on the touch panel which was touched, and the like are sent to the personal computer via the command port 32 and common memory 34. Since the personal computer receives the above data and can determine which menu was selected, the command data indicative of the selected menu is output to the facsimile.

When the result of the selection is received in step S20, the processing routine advances to step S21. In accordance with the result of the selection by the user, the processing routine advances to either one of steps S22, S23 or S25. However, if it was decided in step S17 that "time out" had occurred, step S22 follows.

In step S22, it is determined that the present page is the final page in the FAX transmission, and the FAX task is started in observation that "the next data is absent." In step S23, it is determined that "the next data is present," and the FAX task is started. In step S24, the apparatus waits for completion of the transmission of the present page and the processing routine returns to step S11. In step S25, the FAX task is instructed to halt word processing transmission. In step S26, a processing (the temporary buffer is cleared or the like) regarding the transmission halt is executed. After that, the processing routine returns to step S11. The FAX task denotes a processing to transmit the MH-encoded data stored in the temporary file to the designated destination on a page unit basis. The FAX task is also called in the ordinary case of reading the document image and transmitting. Since the above processing is not so different from the ordinary facsimile transmission, its detailed description is omitted. The discriminating process in step S18 is provided to cope with a requirement such that the operator wants to transmit only the head page of the formed document or the like in the case of the word processor transmission. Step S18 is also provided to quit the annoying menu display for the second and subsequent pages in the case where, for example, the "whole page transmission" was selected.

DESCRIPTION OF IMAGE READING

An example in which the printer 23 of the facsimile and the facsimile transmission are effectively used has been described above. An example in which the image scanner 22 to read the document or the image which was received by the facsimile is utilized will now be described. That is, the following operations are realized without changing the application software for the PC-XT at all.

1. The read data from the image scanner 22 of the facsimile is returned to the application side, as is done with a general scanner connected to the PC-XT (for example, via a serial port).
2. The data which was FAX received is returned to the application side, as is done with a general scanner connected to the PC-XT.

Figure 9:
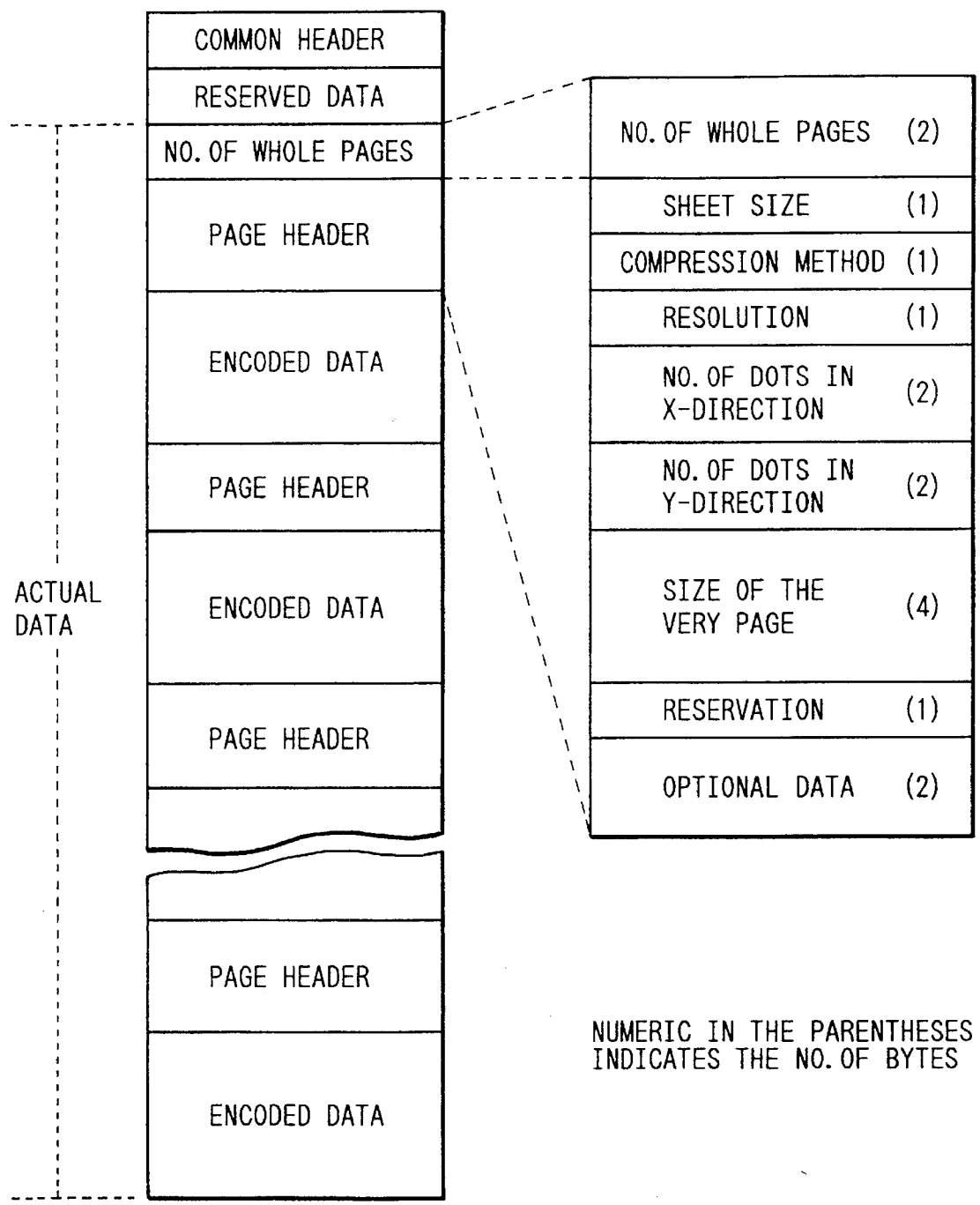
FIG. 9 is a diagram showing a format of FAX received data which was formed in the embodiment.

In the case where no command is given to the facsimile side, the image which was received via the line is ordinarily printed by the printer 23 by a predetermined receiving processing. However, by outputting predetermined command data from the personal computer via the command port 30, the personal computer receives via the common memory 34 the data which was received through the line, and can store such data in the auxiliary memory device 14. The objective operation of the item (2) uses the FAX received data stored in the auxiliary memory device 14o The facsimile apparatus compresses the image data by the MH-encoded data and transmits. By the above processing, the apparatus can store the received MH-encoded data into the memory device 14 as a file. FIG. 9 shows the details of a reception file. A "common header," "reserved data" and "no. of whole pages" are provided to specify the reception file, with a "page header" and an "encoded data" provided for each page. The number of whole pages of the document images which were received is stored in the "no. of whole pages," for which two bytes are allocated. Information as shown in the diagram is stored as a content of the page header. An image reading processing of the embodiment will now be described in consideration of the foregoing outline.

A processing to fetch the read data of the application (for example, image edition or OCR or the like) which is operated by the PC-XT and uses a scanner will now be simply explained. It will be readily appreciated that a device driver program to read the data from the scanner is provided before the application is operated.

The image scanner scans the document surface to be read line by line in a manner similar to the image scanner 22 of the facsimile. The scanning direction is set to the main scanning direction and the relative moving direction (moving direction of the document or scanner) of the image scanner and the document which is perpendicular to the main scanning direction is set to the sub scanning direction.

In the software using the scanner, the following processings are ordinarily executed to specify a reading range of the document surface:

1. The reading start position and the number of dots to be read are designated for the main scanning direction.
2. For the sub scanning direction, a specified range is read by skipping the lines.

The processing flow is shown in detail in the flowchart of FIG. 8.

First, the scanner is initialized (step S81). The initialization also includes a paper discharge processing or the like in the case where, for instance, the preceding reading operation or the like was stopped. Then, scanner parameters are set (step S82). These parameters include resolutions in the main and sub scanning directions, a reading start position in the main scanning direction, a reading width in the main scanning direction, a reading destiny, a reading mode (binary, dither, multivalue, etc.), and a data type (raw data, run length, MH data, etc.). After the parameters are set, step S83 follows and a line skipping processing is executed until the scanner reaches the line to be read (n lines from the start of the reading). After the scanner reaches the line to be read, a processing to read the data line by line is executed (steps S84 and S85) because a reading interval (m lines) is reached. After that, a processing to skip the lines until the end of the document is executed and the reading of the document is finished.

In the embodiment, the application paid attention to is that the scanner reads the data in the above processings, the apparatus operates as if the scanner scanned the image, and the data is returned to the application.

Figure 10:
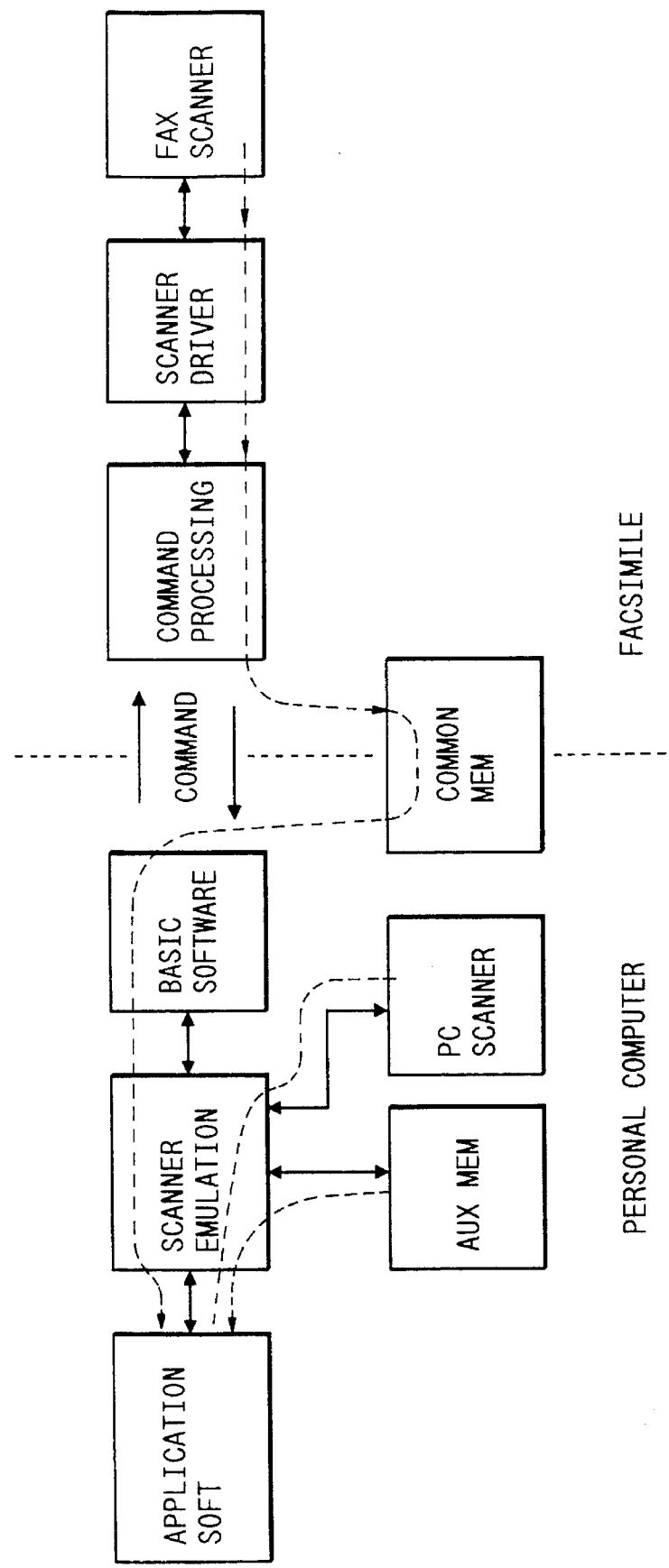
FIG. 10 is a diagram showing the flow of data read by an image scanner in the embodiment.

The processings will be executed as shown in FIG. 10. Through a scanner emulation driver software provided in the personal computers an object to be read is set to the FAX reception data stored in the auxiliary memory device 14, the image scanner 22 (referred to as a FAX scanner) of the facsimile, or the inherent image scanner (referred to as a personal computer scanner or PC scanner) connected to the personal computer.

Ordinarily, when an application software using the image scanner (PC scanner) is started, the scanner driver is loaded into the memory before the application software is started. However, in the embodiment, a driver having three functions of the personal computer scanner, FAX scanner, and FAX reception data which have been prepared is provided and they are previously loaded before the application is started.

Figure 11:
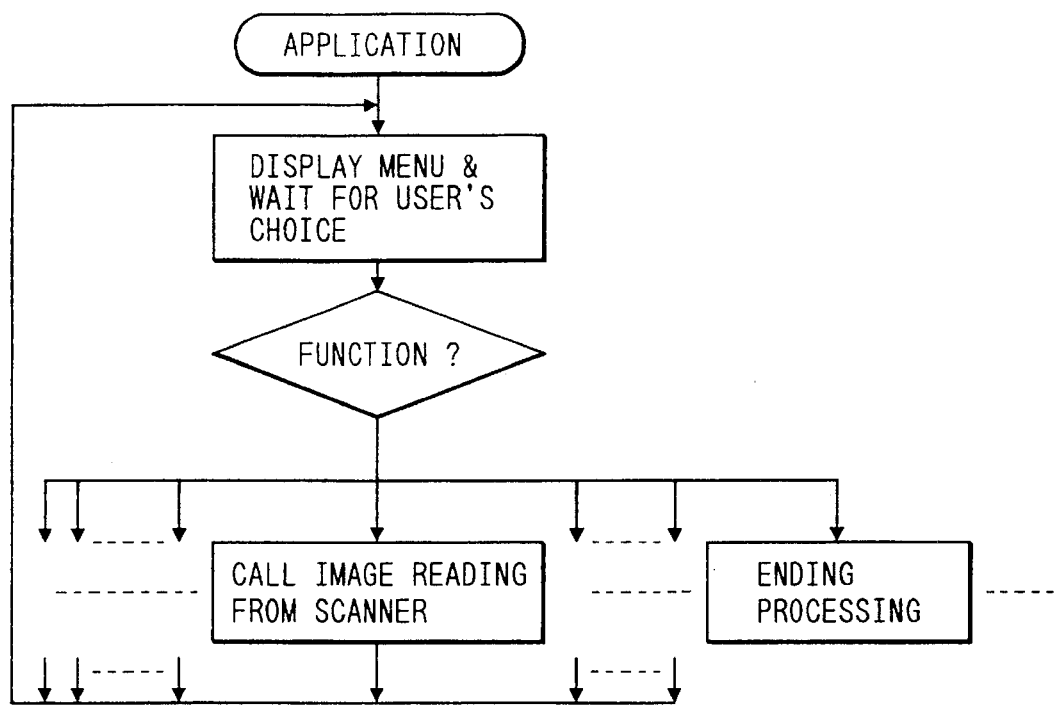
FIG. 11 is a flowchart for an application software using the image scanner which operates in the personal computer.
Figure 12:
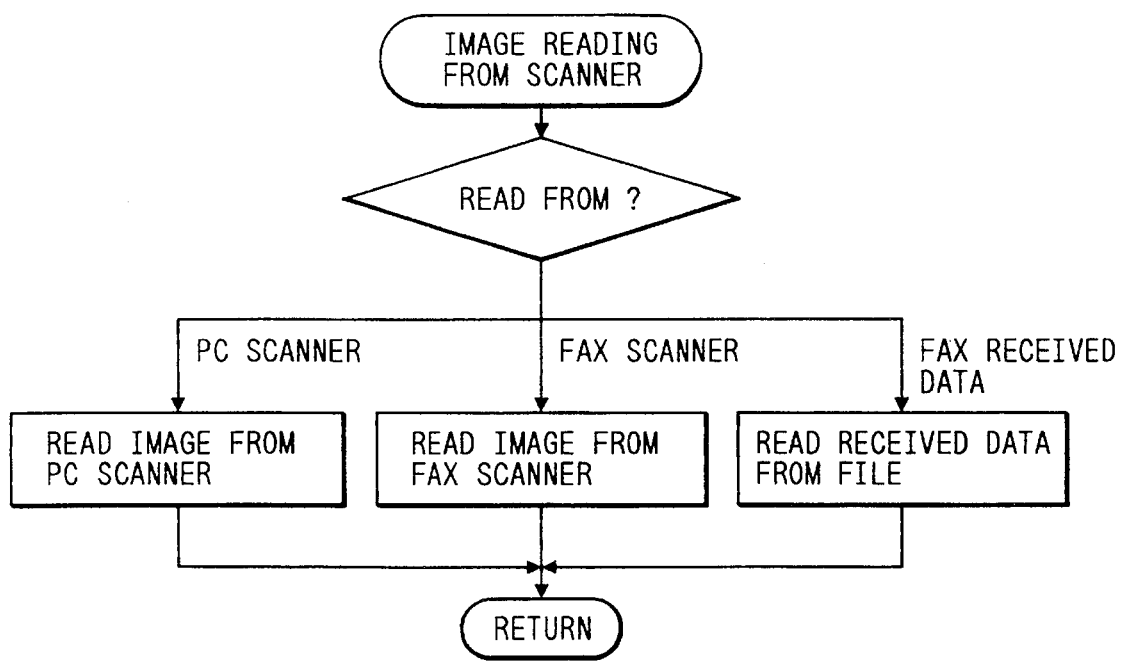
FIG. 12 is a flowchart describing the selection of a reading object which is started when an image reading process is instructed.

As shown in a flowchart of FIG. 11, most of the application software products that use the image scanner fundamentally select one of the processing menus and repetitively execute the processing of the selected menu. Among them, if a command to execute an image reading process from the scanner is given, the above-described driver is activated and menus to select an object to be read are displayed as shown in FIG. 12. The operator selects either one of the menus by using the touch panel 21, so that the processings of FIG. 8 described above are begun.

The case where an object to be read by the image scanner was set to the FAX reception data will now be described. In this case as well, the image data is fetched through the processings shown in FIG. 8 and the processing contents are as follows.

Figure 13:
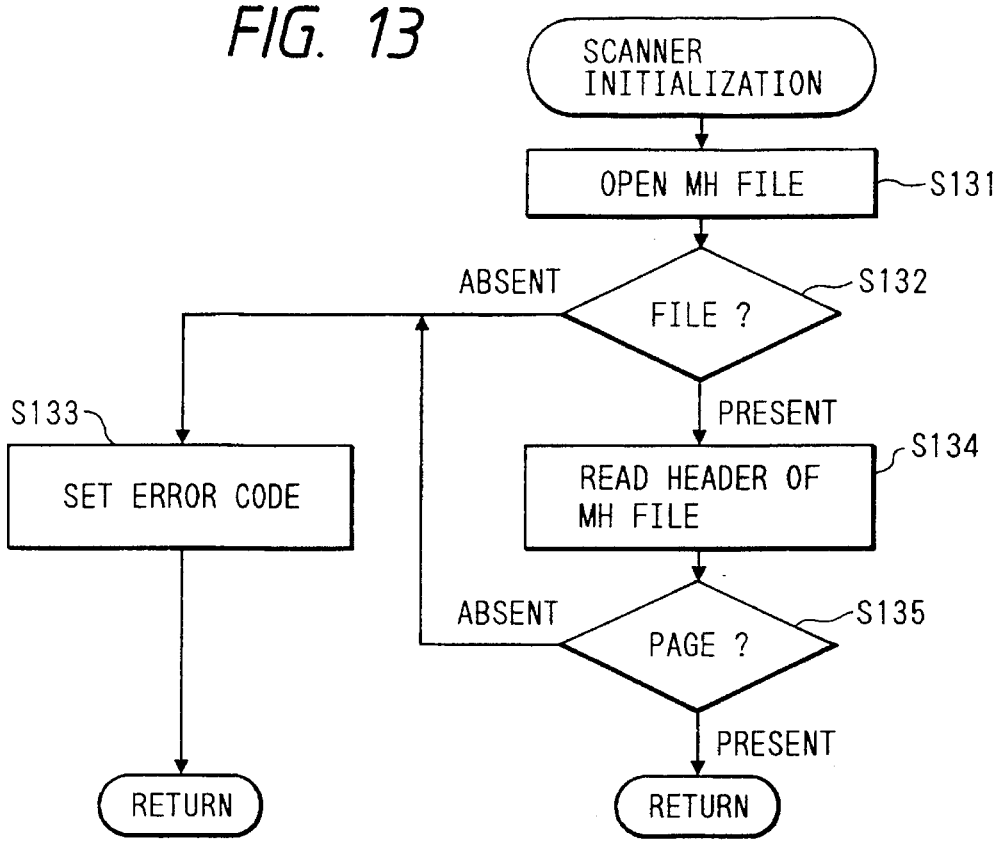
FIG. 13 is a flowchart showing the content of an initializing process of the scanner in the case where the FAX received data is used as an object to be read.

First, an initializing processing of the scanner in step S81 will be described with reference to FIG. 13.

In step S131, the MH file stored in the auxiliary memory device 14 is opened. If it is decided in step S132 that there is no MH file to be opened, an error code (e.g., absence of document) is set (step S133) and the processing routine is returned to the application, If the relevant file does exist, the header of the MH file is read and a check is made to see if a page image to be read exists. If it does, the processing (step S82) at the next stage is executed. If it does not, step S133 follows.

Figure 14:
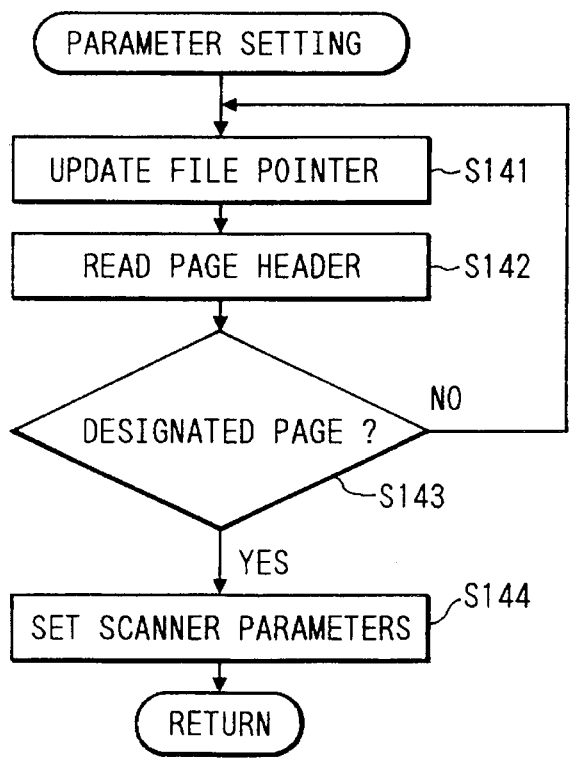
FIG. 14 is a flowchart showing the content of a parameter setting process in the case where the FAX received data is used as an object to be read.

After the scanner is correctly initialized, the processing routine advances to step S82 to execute a parameter setting processing. The parameter setting processing will be described in detail with reference to FIG. 14.

A pointer indicative of the special position in the MH file opened by the foregoing processing is first moved to the head position of the target page (page data and encoded data) (step S141). The page header of the target page is read (step S142). In step S143, a check is made to see if the target page is a page to be read (i.e., the page designated by the operator). The target page is sequentially updated until the desired page comes.

After the pointer is updated to the page to be read, the processing routine advances to step S144 and the reading start position and reading width in the main scanning direction are set, or the data type is set. The other parameters are set in accordance with the MH file.

After the parameter setting processing in step S82 is finished, step S83 follows and a processing to skip n lines is executed.

Figure 15:
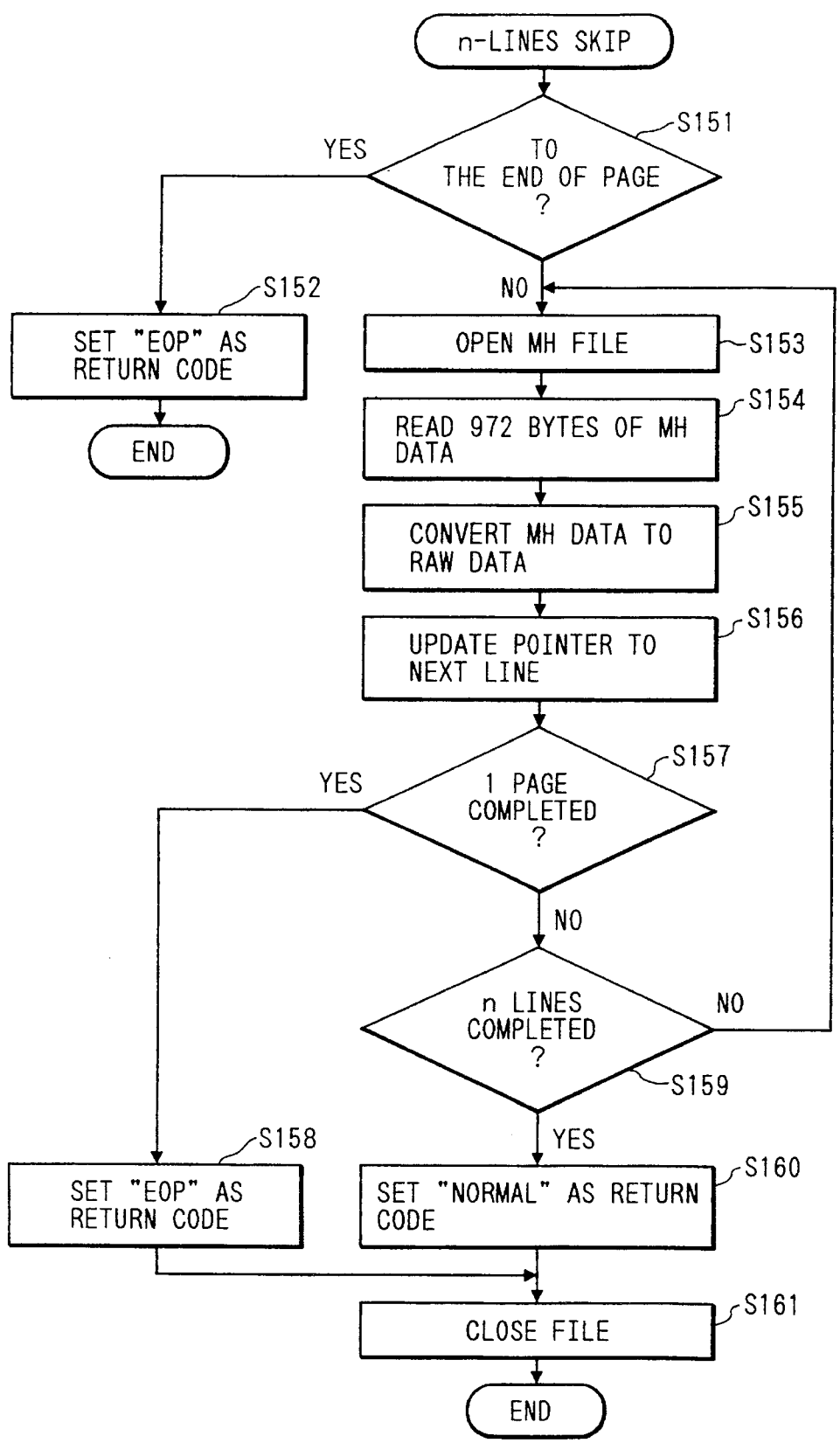
FIG. 15 is a flowchart showing the content of a skipping process of n lines in the case where the FAX received data is used as an object to be read.

An example of the n-line skipping processing will be explained with reference to FIG. 15.

In step S151, a check is first made to see if the lines until the end of the page are skipped. If they are, step S152 follows and an EOP (end of page) code is returned as a return code when returning to the application. If they are not, the MH file is opened (step S153) and the data of 972 bytes in the encoded data of the target page is read (step S154) and converted into the raw data (i.e., dot image data) (step S155). After that, the pointer is updated to the position of the MH data of the next line (step S156). A check is made to see if one page has been completed on the basis of the value of the pointer (step S157). If it is determined that the processing of one page has been completed, the EOP code is returned as a return code to return the processing routine to the application. Step S161 then follows and the file is closed. On the other hand, if the page has not been completed, in step S157, a check is made to see if the number of lines to be skipped has reached n or not (step S159). The processings in step S153 and subsequent steps are repeated until the number of lines to be skipped reaches n in step S159. When this occurs, a normal code indicating that the line skipping processing has correctly been executed is returned as a return code to return to the application (step S160). The file is then closed (step S161). The reason why the reading unit was set to 972 bytes is because, in the MH data, a data length of one line is unknown and its maximum length is set to 972 bytes.

When the reading line comes, the processing routine advances to step S84 and a processing to actually emulate the image reading processing of one line is executed.

Figure 16:
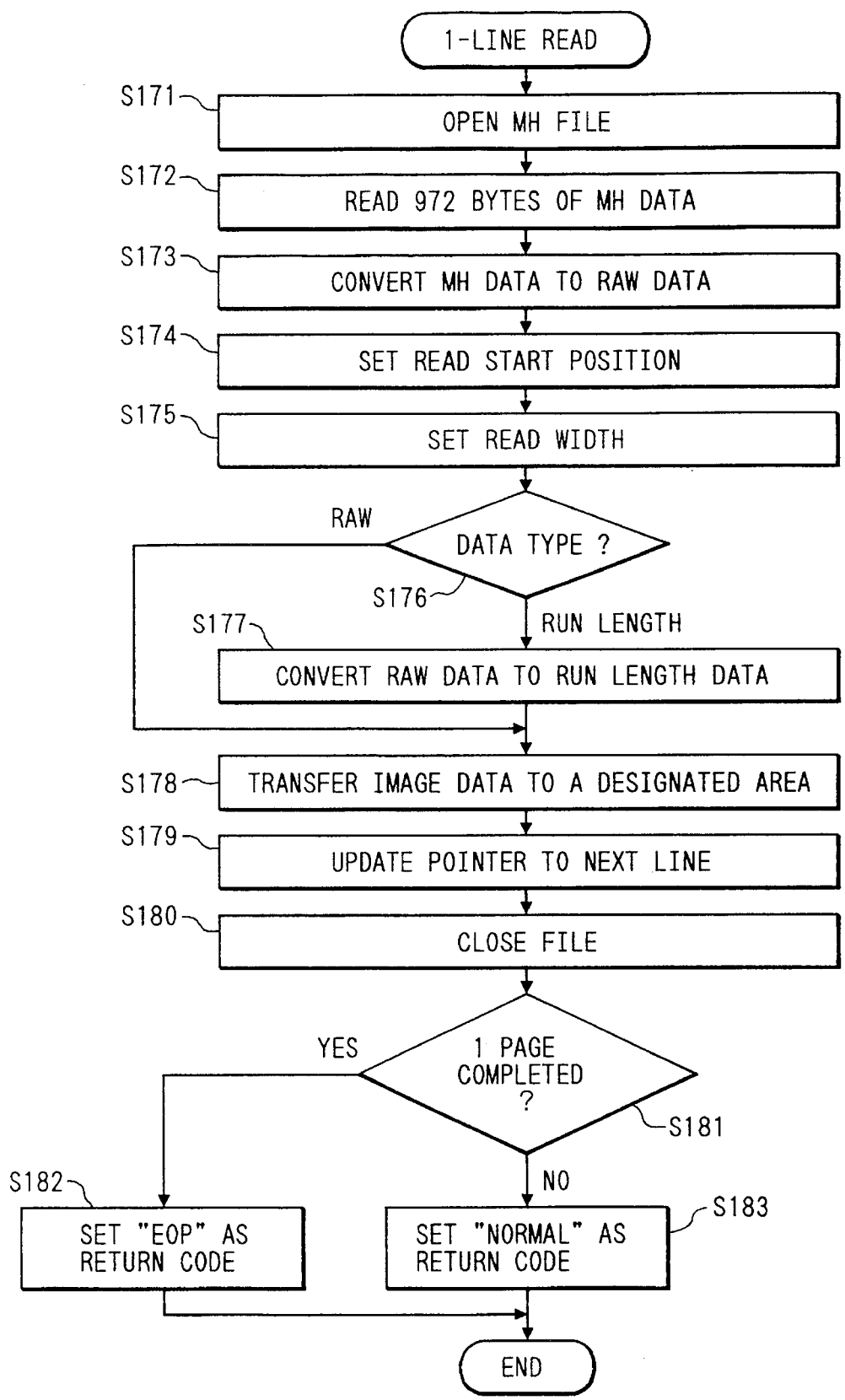
FIG. 16 is a flowchart showing the content of a reading process of one line in the case where the FAX received data is used as an object to be read.

The reading processing of the data of one line is executed in accordance with the flowchart of FIG. 16.

First, the MH file is opened (step S171) and the data of 972 bytes in the MH data is read (step S172). Then, by encoding the encoded data, the image data of the target line is generated (step S173). After that, the reading starting position and the reading width which have been set before are set for the image data of the target line derived (steps S174 and S175). Then, the data type is discriminated. For instance, if the data type indicates the run length data, the dot data at the designated position is converted into the run length data. If there is no need to execute such a conversion, nothing is performed and step S178 follows. In step S178, the data obtained by the conversion or the image data in the designated range is transferred to the designated area, thereby preparing to transfer the data to the application side. At this time, a processing such as thin-out, interpolation, or the like of the derived image data is also executed so as to match with the resolution which was designated by the foregoing parameter setting processing.

After that, the pointer is updated to the position of the MH data of the next line (step S179) and the file is closed (step S180). A check is made to see if the line to be read has reached the end of the page. (step S181). If the line to be read has reached the page end, the EOP code is set as a return code. If it is in the middle of the page, the normal code is set as a return code. After that, the processing routine is returned to the inherent routine.

After that, the processing to skip the lines until the end of the document in step S86 is executed in accordance with the processing procedure shown in FIG. 17.

That is, the target MH file is opened (step S191) and the data of 972 bytes in the MH data is read. The image data of one line is generated (step S193). The reason why the image data of one line is generated is because it is impossible to discriminate the end point of the image data of one line. Then, the pointer is updated to the position of the MH data of the next line (step S194) and the MH file is closed. A check is then made to see if the image data of one line which was generated as a dummy relates to the end of one page (step S196). The processing corresponding to the result in the discriminating step S196 is executed in step S197 or S198, respectively. After that, the processing routine is returned.

The processings described above relate to the example in which the emulation is executed as if the FAX received data stored in the auxiliary memory devices was read by the image scanner. However, in the case of using the image scanner 22 of the facsimile, the image data is fetched via the common memory 34. At this time, the image data can be fetched to the facsimile by transmitting and receiving command data. For instance, as a facsimile, it is sufficient to construct in a manner such that the image data which was read by the image scanner 22 is once stored into the memory 27 and, thereafter, the data of one line is interpolated or thinned out so as to obtain the designated resolution each time a command is input from the personal computer. The interpolated or thinned-out data is written into the common memory 34, and the command data indicative of the execution of such a processing is transmitted to the personal computer side.

As described above, according to the embodiment, the facsimile function can be integrated while keeping compatibility with a general personal computer. Moreover, the function accompanied with the facsimile apparatus can be utilized without changing the application software operated by the general personal computer.

For instance, the image data which was formed by the application software and which is the data to be printed can be printed and output as a visible image by the facsimile and can also be directly transmitted to a remote facsimile apparatus by an ordinary printing operating procedure.

On the other hand, in the case of the application software using the image scanner, the image scanner on the facsimile side can be used in place of such an image scanner, or the FAX received data itself can be also processed as if it was read by the image scanner. The apparatus of the invention has the ability to employ a large number of software products, and has a large number of applications.

Further, since a common memory (64 kbytes) of a large capacity is provided between the personal computer and the facsimile, the processing program or the like for the facsimile can be also supplied. Therefore, debugging or the like of the facsimile can be easily performed.

The embodiment has been described with respect to the case where, for instance, the PC-XT made by IBM Corporation of U.S.A. was used as a general personal computer and "MS-DOS" made by Microsoft Corporation of U.S.A. was used as an operating system. However, the invention is not limited to the above case. That is, the invention can be also applied to other personal computers of different hardwares and other operating systems.

As described above, according to the invention, while the software products operated by the general personal computer are used, the facsimile function can be effectively used and integrated.

On the other hand, if a print command is generated from the personal computer, the printing can be performed by the printer on the facsimile apparatus side, so that the facsimile function can be effectively used.

When predetermined command data are previously received from the personal computer irrespective of the application software which can be operated by the personal computer, the received print data can be converted into data for facsimile transmission and can be transmitted.

On the other hand, the document image which was read by the facsimile or the facsimile received data can also be transmitted to the application of the personal computer as if it was read by the image scanner. Its application range can be remarkably widened.

We claim:

1. A processing system having a facsimile function and other functions, said processing system comprising:

common memory means for storing a program for performing the facsimile function and the other functions;

common work memory means for storing data required for the facsimile function and the other functions;

first and second processing means each connected between said common memory means and said common work memory means each for processing data, wherein each of said first and second processing means accesses said common memory means and said common work memory means;

print means for printing, at a first resolution, data processed by said first processing means; and interpolating means for interpolating data processed by said second processing means such that the processed data is printed by said print means, wherein said interpolating means causes said print means to print, at a second resolution different from the first resolution, the data processed by said second processing means with a correction of a change in character size due to the difference between the first and second resolutions.

2. A system according to claim 1, wherein said first and second processing means each comprises a microprocessor.

3. A system according to claim 1, wherein said common memory means is defined in an address space of said first and second processing means.

4. A system according to claim 1, wherein said common memory means comprises an addressable memory.

5. A system according to claim 1, wherein said common work memory means is defined in an address space of said first and second processing means.

6. A system according to claim 1, wherein said common work memory means comprises an addressable memory.

7. A system according to claim 1, wherein said common memory means and said common work memory means are defined in a continuous address of an address space of said first and second processing means.

8. A processing system having a first processing function and a second processing function, said processing system comprising:

common memory means for storing a program for performing the first function and the second function;

common work memory means for storing data required for the first function and the second function;

first and second processing means each connected between said common memory means and said common work memory means each for processing data, wherein each of said first and second processing means accesses said common memory means;

visualizing means for visually outputting data processed by said first processing means; and correcting means for correcting data processed by said second processing means such that the processed data is visually output by said visualizing means, wherein said correcting means corrects a size of the data processed by said second processing means.

9. A system according to claim 8, wherein said first and second processing means each comprises a microprocessor.

10. A system according to claim 8, wherein said common memory means is defined in an address space of said first and second processing means.

11. A system according to claim 8, wherein said common memory means comprises an addressable memory.

12. A system according to claim 8, wherein said common work memory means is defined in an address space of said first and second processing means.

13. A system according to claim 8, wherein said common work memory means comprises an addressable memory.

14. A system according to claim 8, wherein said common memory means and said common work memory means are defined in a continuous address of an address space of said first and second processing means.

15. A processing system having a first processing function and a second processing function, said processing system comprising:

common memory means for storing a program for performing the first function and the second function;

common work memory means for storing data required for the first function and the second function;

first and second processing means each connected between said common memory means and said common work memory means each for processing data, said first processing means receiving data from another system and each of said first and second processing means accessing said common memory means for data reading;

visualizing means for visually outputting data processed by said first processing means; and conversion means for converting a resolution of data processed by said second processing means such that the processed data is visually output by said visualizing means, wherein said conversion means changes the resolution of the data processed by said second processing means so as to keep a size of that data unchanged.

16. A system according to claim 15, wherein said first and second processing means each comprises a microprocessor.

17. A system according to claim 15, wherein said common memory means is defined in an address space of said first and second processing means.

18. A system according to claim 15, wherein said common memory means comprises an addressable memory.

19. A system according to claim 15, wherein said common work memory means is defined in an address space of said first and second processing means.

20. A system according to claim 15, wherein said common work memory means comprises an addressable memory.

21. A system according to claim 15, wherein said common memory means and said common work memory means are defined in a continuous address of an address space of said first and second processing means.

22. A compound electronic apparatus comprising:

a general purpose personal computer;

a facsimile having a printer for printing, at a facsimile resolution, data received from another facsimile;

a memory provided common to both said facsimile and said personal computer such that data received by either said personal computer or said facsimile can be transmitted from one to the other;

a group of ports connected to transfer commands and data between said personal computer and said facsimile; and emulation means for enabling the printer of said facsimile to print, at a resolution designated by said personal computer, data transmitted from said computer to said facsimile, the designated resolution being different from the facsimile resolution.

* * * * *

UNITED STATES PATENT AND TRADEMARK OFFICE
CERTIFICATE OF CORRECTION

PATENT NO. : 5,598,533

DATED : January 28, 1997

INVENTOR(S) : MASAYUKI YOKOTA, ET AL.            Page 1 of 2

It is certified that error appears in the above-identified patent and that said Letters Patent is hereby corrected as shown below:

On the title page:

AT [56] U.S. PATENT DOCUMENTS

Insert:

"5,159,681   10/1992   Beck, et al.        395/116
 5,146,547    9/1992   Beck, et al.        395/116
 5,001,653    3/1991   Buchanan, et al.    395/102
 4,896,275    1/1990   Jackson             395/115
 4,694,405    9/1987   Bradbury, et al.    395/110"

COLUMN 3

Line 14, "liked" should read --like,--; and
Line 40, "documents a" should read --document,--.

COLUMN 10

Line 33, "11o" should read --11.--.

COLUMN 11

Line 38, "14o" should read --14.--.

UNITED STATES PATENT AND TRADEMARK OFFICE
CERTIFICATE OF CORRECTION

PATENT NO. : 5,598,533

DATED : January 28, 1997

INVENTOR(S) : MASAYUKI YOKOTA, ET AL.

Page 2 of 2

It is certified that error appears in the above-identified patent and that said Letters Patent is hereby corrected as shown below:

COLUMN 12

Line 31, "computers an" should read --computer, an --.

Signed and Sealed this

Fourteenth Day of October, 1997

Attest:

BRUCE LEHMAN

Attesting Officer

Commissioner of Patents and Trademarks